United States Patent
Henrikson

[19]

[11] Patent Number: 5,923,673
[45] Date of Patent: *Jul. 13, 1999

[54] IEEE 1394 DATA/PROTOCOL ANALYZER

[75] Inventor: Gregory Keith Henrikson, Brea, Calif.

[73] Assignees: Sony Corporation, Tokyo, Japan; Sony Trans Com, Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/800,257

[22] Filed: Feb. 13, 1997

[51] Int. Cl.$^6$ .................................................. C01R 31/28
[52] U.S. Cl. ...................................... 371/20.1; 395/183.19
[58] Field of Search .................................. 371/20.1, 27.5, 371/68.2, 22.1, 22.5, 25.1, 28; 395/183.01, 183.15, 185.01, 185.1, 916, 183.03, 183.19, 183.21, 184.01; 364/550, 514; 370/234, 241, 253, 252

[56] References Cited

U.S. PATENT DOCUMENTS

| | | | |
|---|---|---|---|
| 5,457,694 | 10/1995 | Smith | 395/325 |
| 5,504,757 | 4/1996 | Cook et al. | 370/84 |
| 5,521,907 | 5/1996 | Ennis, Jr. et al. | 370/17 |
| 5,526,283 | 6/1996 | Hershey et al. | 361/514 C |
| 5,557,724 | 9/1996 | Sampat et al. | 395/157 |
| 5,579,486 | 11/1996 | Oprescu et al. | 395/200.15 |
| 5,615,135 | 3/1997 | Waclawsky et al. | 364/551.01 |
| 5,630,048 | 5/1997 | La Jole et al. | 395/183.01 |

OTHER PUBLICATIONS

"1394 Data Analyzer User's Guide," 3A International, preliminary Beta Test Version, Beta Rev. 0.7, Document Revision 1.1, 1996.

Primary Examiner—Robert W. Beausoliel, Jr.
Assistant Examiner—Nadeem Iqbal
Attorney, Agent, or Firm—Haverstock & Owens LLP

[57] ABSTRACT

An IEEE 1394 serial bus network data capture and analyzer device is coupled within an IEEE 1394 serial bus network for monitoring, capturing and analyzing data communications transmitted over the IEEE 1394 serial bus network. The data capture and analyzer device is preferably implemented within a computer system and includes an IEEE 1394 serial bus network interface card for communicating over the IEEE 1394 serial bus. The data capture and analyzer device also includes a user interface which is displayed on a display device coupled to the computer system. Through the user interface and input devices coupled to the computer system, a user selects a function to be performed by the data capture and analyzer device. Preferably, the functions allow a user, through the data capture and analyzer device, to at least trigger on a specific packet header, field or data pattern, trigger on an error and capture a specific time or cycle event. Captured data is stored within an internal memory of the computer system. From the internal memory, data is stored on a mass storage device, floppy disk or tape media. Captured data is also displayed for the user through the user interface and printed on a printer thereby allowing a user to analyze and record the data communications for testing and monitoring of the communications over the IEEE 1394 serial bus.

17 Claims, 5 Drawing Sheets

IEEE 1394 DATA/PROTOCOL ANALYZER

FIELD OF THE INVENTION

The present invention relates to the field of analyzing communications sent over a bus structure or network. More particularly, the present invention relates to the field of capturing and analyzing communications sent over a bus structure or network.

BACKGROUND OF THE INVENTION

The IEEE 1394 standard, "P1394 Standard For A High Performance Serial Bus," Draft 8.01vl, Jun. 16, 1995, is an international standard for implementing an inexpensive high-speed serial bus architecture which supports both asynchronous and isochronous format data transfers. The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. An 'application' as used herein will refer to either an application or a device driver.

The cable specified by the IEEE 1394 standard is very thin in size compared to many other cables, such as conventional co-axial cables, used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 cable environment is a network of nodes connected by point-to-point links, including a port on each node's physical connection and the cable between them. The physical topology for the cable environment of an IEEE 1394 serial bus is a non-cyclic network of multiple ports, with finite branches. The primary restriction on the cable environment is that nodes must be connected together without forming any closed loops.

The IEEE 1394 cables connect ports together on different nodes. Each port includes terminators, transceivers and simple logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

A lack of existing IEEE 1394 data/protocol analyzers makes it difficult to capture and analyze data communications which are sent over an IEEE 1394 serial bus network. Specifically, there is a lack of existing IEEE 1394 data/protocol analyzers which can be used by both operational and maintenance workers. Therefore, what is needed is an IEEE 1394 data/protocol analyzer for capturing and analyzing communications transmitted over an IEEE 1394 serial bus network. Further, what is needed is an IEEE 1394 data/protocol analyzer which can be easily used by both operational and maintenance workers.

SUMMARY OF THE INVENTION

An IEEE 1394 serial bus network data capture and analyzer device is coupled within an IEEE 1394 serial bus network for monitoring, capturing and analyzing data communications transmitted over the IEEE 1394 serial bus network. The data capture and analyzer device is preferably implemented within a computer system and includes an IEEE 1394 serial bus network interface card for communicating over the IEEE 1394 serial bus. The data capture and analyzer device also includes a user interface which is displayed on a display device coupled to the computer system. Through the user interface and input devices coupled to the computer system, a user selects a function to be performed by the data capture and analyzer device. Preferably, the functions allow a user, through the data capture and analyzer device, to at least trigger on a specific packet header, field or data pattern, trigger on an error and capture a specific time or cycle event. Captured data is stored within an internal memory of the computer system. From the internal memory, data is stored on a mass storage device, floppy disk or tape media. Captured data is also displayed for the user through the user interface and printed on a printer thereby allowing a user to analyze and record the data communications for testing and monitoring of the communications over the IEEE 1394 serial bus. Preferably, the data capture and analyzer device is used to monitor, capture and analyze data communications within an inflight entertainment system on an aircraft. Alternatively, the data capture and analyzer device is used to monitor, capture and analyze data communications within any other appropriate system, either mobile or fixed, including but not limited to other transportation modes, e.g. train, bus, ferry and cruise ship.

DETAILED DESCRIPTION OF THE PREFERRED EMBODIMENT

An IEEE 1394 serial bus network data capture and analyzer device is coupled as a device within an IEEE 1394 serial bus network for monitoring, capturing and analyzing communications between other devices over the IEEE 1394 serial bus network. Preferably, the IEEE 1394 serial bus network data capture and analyzer device is implemented within a personal computer (PC) system and includes an IEEE 1394 serial bus network interface card for communicating over the IEEE 1394 serial bus network. Of course, it is envisioned that a data capture and analyzer device can also be included within other types of devices which include digital logic circuits. The IEEE 1394 serial bus network data capture and analyzer device also includes a user interface which is displayed on a display device, such as a monitor connected to the PC. Through this user interface and the PC's input devices, a user selects a function to be performed by the IEEE 1394 serial bus network data capture and analyzer device. Preferably, the functions are enabled/triggered upon detecting a specific packet header, field or data pattern, trigger on an error and capture a specific time or cycle event. The data is stored within the internal memory of the PC, as it is being captured. From the internal memory, the data can be stored on a mass storage device within the PC or on a floppy disk or tape media. Through the user interface, the captured data is also displayed for viewing by the user. If the user desires, the captured data is also printed on a printer connected to the PC. This allows the user to analyze and record the captured data to test and monitor communications over the IEEE 1394 serial bus network.

Figure 1:
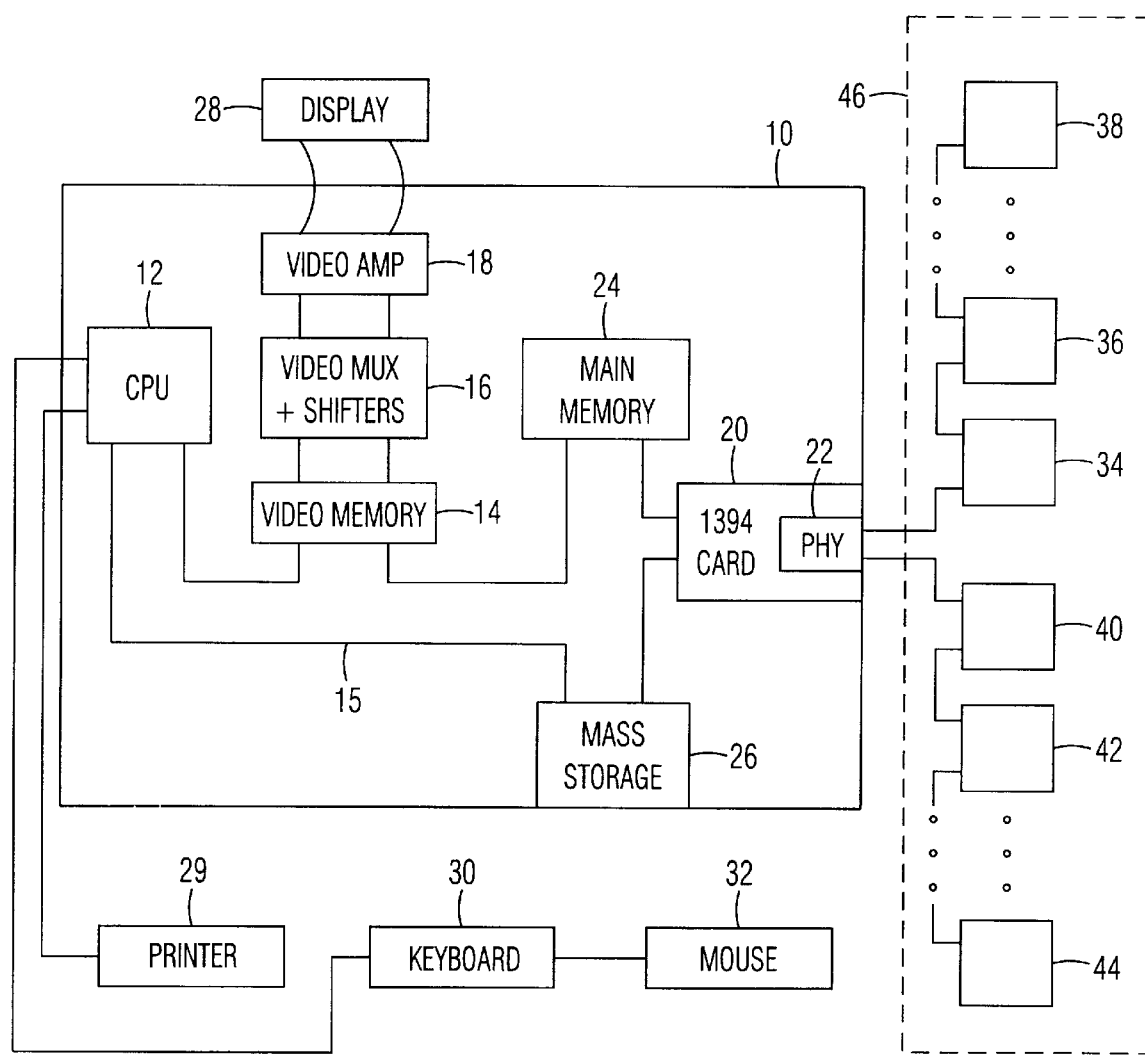
FIG. 1 illustrates a block diagram of the IEEE 1394 serial bus network data capture and analyzer device of the present invention.

A block diagram of the IEEE 1394 serial bus network data capture and analyzer device of the present invention is illustrated in FIG. 1. The IEEE 1394 serial bus network data capture and analyzer device is implemented within a PC 10. An IEEE 1394 interface card 20 including an IEEE 1394 physical connection 22 is incorporated within the PC 10. Preferably, the IEEE 1394 interface card 20 includes two ports implemented within the physical connection 22. A first port of the interface card 20 is coupled to a port of a first device 34 which is coupled within the IEEE 1394 serial bus network 46. A second port of the interface card 20 is coupled to a port of a second device 40 which is also coupled within the IEEE 1394 serial bus network 46.

A number of devices 34, 36, 38, 40, 42 and 44 are coupled within the IEEE 1394 serial bus network and communicate with each other over the IEEE 1394 serial bus structure. The interface card 20 of the present invention is coupled between two of the devices within the IEEE 1394 serial bus network 46 in order to monitor and capture communications between the devices 34, 36, 38, 40, 42 and 44. When data is being captured, data received on one of the ports of the interface card 20 is filtered and stored in the internal memory 24 of the PC 10 while the data is also retransmitted from the non-receiving port in order to pass the data along to the appropriate devices within the IEEE 1394 serial bus network 46. In this manner, the capturing of data transmitted between the devices 34, 36, 38, 40, 42 and 44 is transparent to the devices 34, 36, 38, 40, 42 and 44.

While the IEEE 1394 serial bus network data capture and analyzer device of the present invention may advantageously be implemented on nearly any conventional computer system or other system under processor control, an exemplary computer system 10 into which the interface card 20 is coupled and on which the data capture and analyzer device is implemented, is illustrated in FIG. 1. The computer system 10 includes a central processor unit (CPU) 12, a main memory 24, a video memory 14 and a mass storage device 26, all coupled together by a conventional bidirectional system bus 15. The interface card 20 includes the physical interface circuit 22 for sending and receiving communications on the IEEE 1394 serial bus. The interface card 20 is also coupled to the bidirectional system bus 15. The mass storage device 26 may include both fixed and removable media using any one or more of magnetic, optical or magneto-optical storage technology, semiconductor or any other available mass storage technology. The system bus 15 contains an address bus for addressing any portion of the memory 14 and 24. The system bus 15 also includes a data bus for transferring data between and among the CPU 12, the main memory 24, the video memory 14, the mass storage device 26 and the interface card 20.

The computer system 10 is also coupled to a number of peripheral input and output devices including the keyboard 30, the mouse 32, the display 28 and the printer 29. The printer 29 is coupled to the CPU 12 for printing data output from the computer system 10. The keyboard 30 is coupled to the CPU 12 for allowing a user to input data and control commands into the computer system 10. A conventional mouse 32 is coupled to the keyboard 30 for manipulating graphic images on the display 28 as a cursor control device. The mouse 32 can also be coupled to the system bus. Alternatively, any other appropriate pointing or cursor control device can be used to manipulate graphic images. Particularly, within an inflight entertainment system, use of a mouse may not be practical due to space constraints. Accordingly, another type of pointing or cursor control device will be used in such situations.

Coupled to a port of the video memory 14 is a video multiplex and shifter circuit 16, to which in turn a video amplifier 18 is coupled. The video amplifier 18 drives the monitor or display 28 on which the user interface of the present invention is displayed. The video multiplex and shifter circuitry 16 and the video amplifier 18 convert pixel data stored in the video memory 14 to raster signals suitable for use by the display 28.

The IEEE 1394 serial bus network data capture and analyzer device of the present invention is coupled as a device within the IEEE 1394 serial bus network 46, between the two devices 34 and 40. When the devices within the IEEE 1394 serial bus network 46 send communications over the IEEE 1394 bus structure, the data capture and analyzer device of the present invention captures those communications through the interface card 20 and the physical interface 22, as controlled by software stored within the mass storage device 26 and run by the CPU 12. When data is being captured by the system, data received on one port of the physical interface 22 is filtered appropriately, as will be discussed below, and stored in the main memory 24 while the received data is also repeated from the other port of the physical interface 22 in order to pass the data along to the appropriate devices within the IEEE 1394 serial bus network 46. Accordingly, the IEEE 1394 serial bus network captures data which is received and repeated by the physical interface 22 on the interface card 20.

The software of the present invention which controls the operations of the computer system 10 and the connected peripherals, is stored within the mass storage device 26. In the alternative, the software could be stored as firmware within the IEEE 1394 serial bus network data capture and analyzer device. The software is used to control the capturing of the appropriate data and to provide that data as output, according to control inputs received from a user. As is well known in the art, when necessary the software is loaded from the mass storage device 26 to the main memory 24 for use by the CPU 12. The software of the present invention controls the operations and functions of the IEEE 1394 serial bus network data capture and analyzer device, allowing a user to specify that the data captured will trigger or begin upon the occurrence of certain events, such as the detection of a specific packet header, field or data pattern, an error, or a specific time or cycle event. It should also be understood that the data captured can be triggered off of any other appropriate event. In order to capture data triggered off of a specific event, the software implements specific capture filters based on the appropriate trigger event. The capture filters are implemented on the interface card 20 and monitor the data passing through the physical interface 22, between the devices within the IEEE 1394 serial bus network 46, for the appropriate data to be captured.

A user interface is also provided on the display 28 for allowing the user to choose the trigger events, to select captured data for display and to provide the captured data either to the printer 29 or to a media device such as a floppy disk or magnetic tape, through the mass storage device 26. Through the user interface, the keyboard 30 and the mouse 32, a user can choose specific trigger events for capturing data which is transmitted on the IEEE 1394 serial bus network. The system translates the selected trigger event into a predetermined sequence of digital data. Once data is captured, that data is stored in the internal memory 24 and displayed under user command, on the user interface. Through the user interface, the user can also choose to have the captured data printed on the printer 29 or saved on the mass storage device 26.

Figure 2:
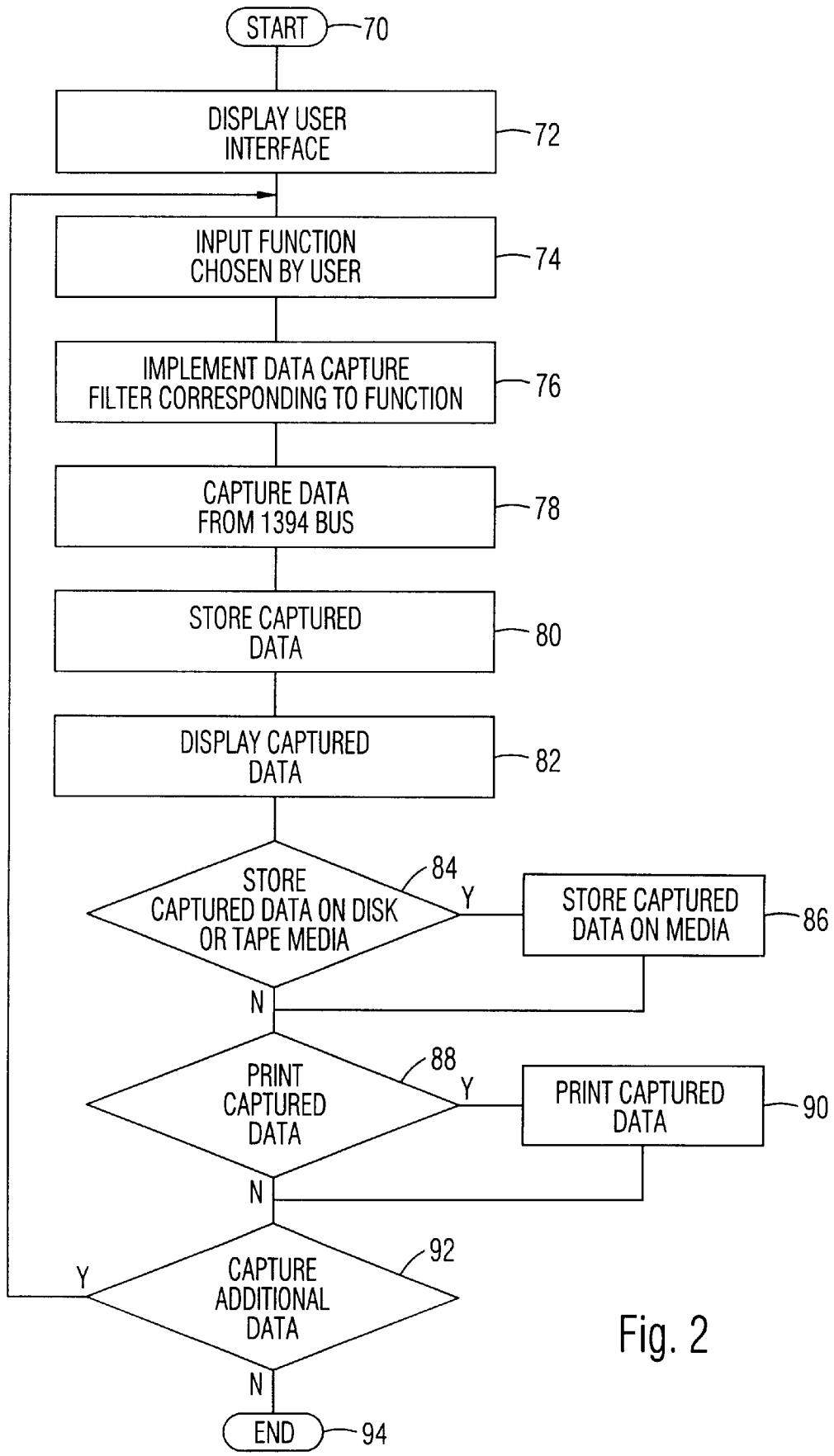
FIG. 2 illustrates a flowchart showing a method of the present invention.

A flowchart showing a method of the present invention is illustrated in FIG. 2. The method starts at the block 70. At the block 72, the user interface is displayed on the display 28. At the block 74, the user enters the function to be implemented by the data capture and analyzer device and the function is translated into a sequence of digital data. Specifically, the function specifies the trigger event to be used to trigger the capture of data. Once a trigger event is entered by the user through the user interface, a filter for capturing that data is implemented at the block 76. As described above, the filter is implemented on the IEEE 1394 network interface card 20. When detected, the specific data is captured at the block 78 and stored on the main memory 24, at the block 80. For example, the filter could be implemented to capture all response retry timeout errors. This error occurs when a transaction response could not be delivered to a device over the IEEE 1394 serial bus within the number of retries specified by the transaction retry limit. The filter is then implemented to detect a response retry timeout error and capture the error transmission and a predetermined number of bytes of data transmitted after the error message. This allows a user to have access to data associated with the error transmission for determining a cause of the error. In this manner, the filter can be programmed to capture any type of specific data, including error transmissions or other types of data. When the data capture and analyzer device is in the monitoring mode, and used within an inflight entertainment system, a filter can be programmed to capture data related to all service which will then allow an operational user to determine the origination and pattern of service requests during a flight.

Once the captured data is stored, appropriate data is displayed on the display 28 at the block 82, based on display criteria entered by the user. At the block 84, it is determined whether or not the user desires to store the captured data on or using the mass storage device 26. The user is prompted, through the user interface, to determine whether the data is to be stored. If the data is to be stored, then the captured data is stored on or using the mass storage device 26, from the main memory 24, at the block 86. Once the data is stored, the method proceeds to the block 88. Otherwise, the method proceeds directly to the block 88 from the block 84.

At the block 88, it is determined whether or not the user desires to print the captured data on the printer 29. The user is prompted, through the user interface, to determine whether the captured data is to be printed. If the data is to be printed, then the captured data is read from the main memory 24 and printed on the printer 29, at the block 90. After the data is printed at the block 90 or the user chooses not to print the data at the block 88, then it is determined at the block 92, whether or not the user desires to capture and analyze additional data. If the user does desire to capture additional data, then the system jumps back to the block 74, where the user specifies the desired function to be used for capturing the data. Otherwise, the method ends at the block 94.

Figure 3:
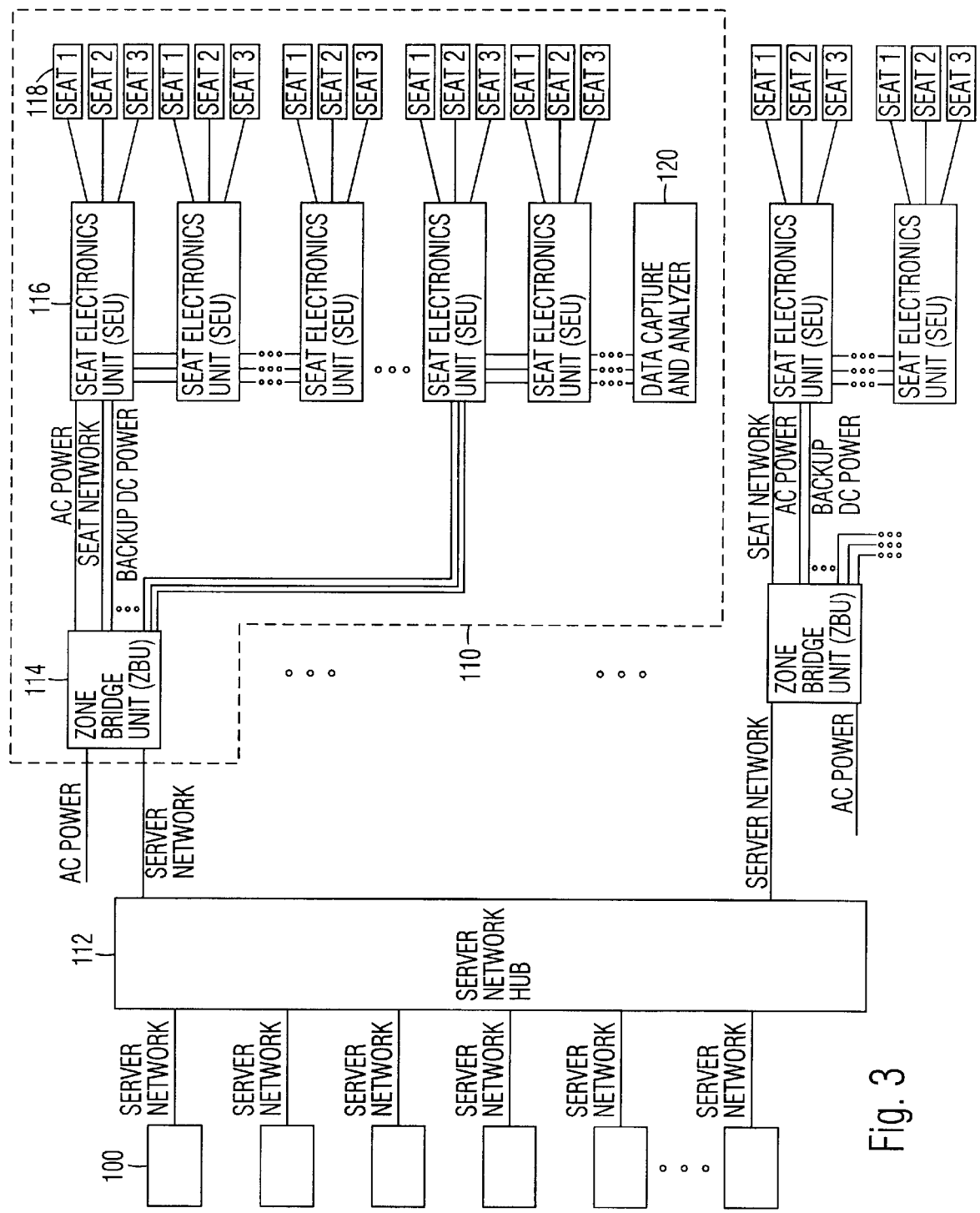
FIG. 3 illustrates a block diagram of an inflight entertainment system including a data capture and analyzer device.

A data capture and analyzer device according to the present invention is especially useful when implemented within an inflight entertainment system as illustrated in FIG. 3. Such an inflight entertainment system is described in U.S. patent application Ser. No. 08/714,772, filed on Sep. 16, 1996 and entitled "Combined Digital Audio/Video On Demand And Broadcast Distribution System," which is hereby incorporated by reference. Within this inflight entertainment system, one or more servers 110 are coupled to a server network hub 112. One or more zone bridge units 114 are coupled to the server network hub 112. The server network hub 112 is preferably an ATM switch which routes communications between the servers 110 and the zone bridge units 114. Each zone bridge unit 114 is coupled to one or more seat electronics units 116 which are each coupled to control a number of passenger control sets of seat peripherals 118. The zone bridge units 114 and the seat electronics units 116 are preferably coupled together by an IEEE 1394 serial bus network. Each seat electronics unit 116 provides a node on the bus structure and controls local applications at the passenger control sets 118. Through the passenger control sets 118, a passenger has access to one or more of audio and video on demand, video games, gambling, telephone service and information services. Each passenger control set of seat peripherals 118 includes a set of peripherals which allow the passenger to access the features and services available through the system. Preferably, each passenger control set 118 includes a seat video display, a passenger control unit and a passenger control handset, which are coupled for sending communications to and receiving communications from the corresponding seat electronics unit 116.

Within this inflight entertainment system the data capture and analyzer device 120 is coupled to the IEEE 1394 network as one of the devices and monitors communications between other devices within the system. In this embodiment, the data capture and analyzer device 120 of the present invention monitors, captures and analyzes specific communications or groups of data based on specified trigger events during use of the system in flight in a monitoring or operational mode. This allows use of the system and any unexpected events to then be analyzed when the airplane on which the system is implemented is not in flight. The data capture and analyzer device can also be used to test or diagnose the configuration and operation of the inflight entertainment system in a maintenance mode.

Figure 4A:
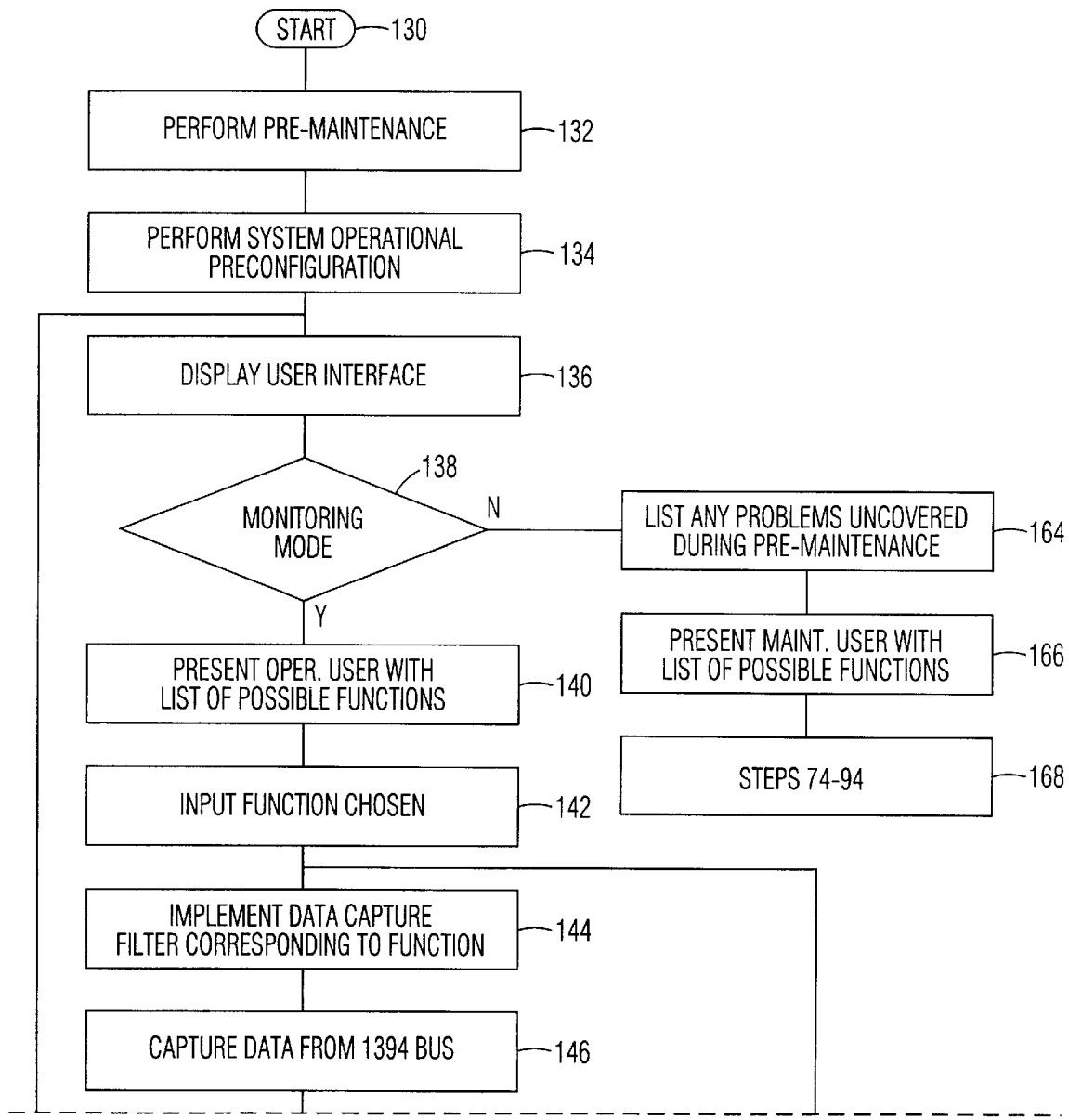
FIG. 4 illustrates a flowchart showing the method of the present invention when implemented within an inflight entertainment system, having operational and maintenance modes.
Figure 4B:
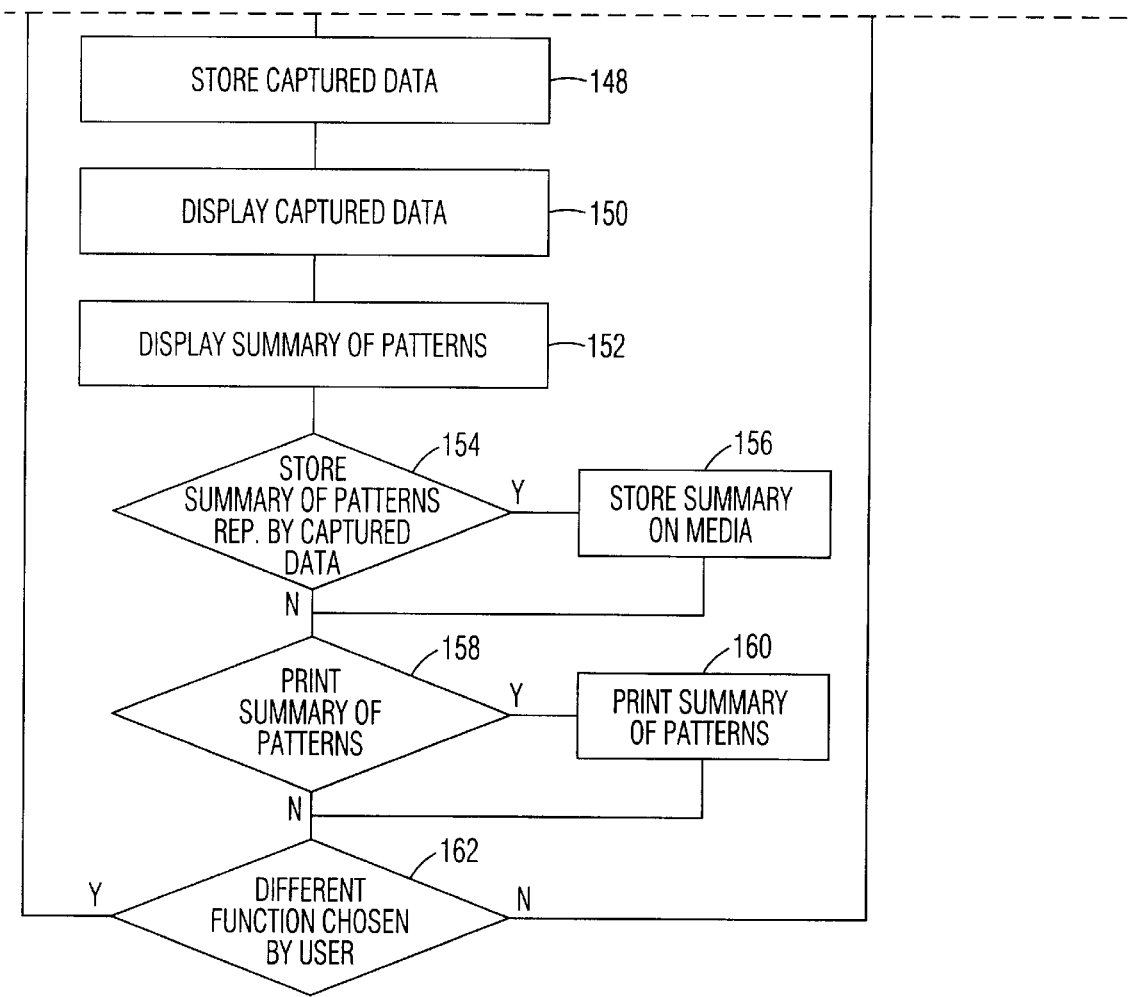

A flowchart showing the method of the present invention when implemented within an inflight entertainment system, having operational and maintenance modes, is illustrated in FIG. 4. The method starts at the block 130. At the blocks 132 and 134, the system performs pre-maintenance on the components of the inflight entertainment system and system operational pre-configuration, determining which nodes coupled to the IEEE 1394 system bus are active and configuring the system for communication between the active nodes. At the block 136, the user interface is displayed on the display 28. From this user interface, the user chooses between the monitoring mode and the maintenance mode. The data capture and analyzer device is used in the monitoring mode by operational personnel of the aircraft during flight to monitor the use of the system and specific usage patterns. The data capture and analyzer device is used in maintenance mode by maintenance personnel on the ground to determine the source of operating problems within the system or to confirm that the system is operating properly. The data capture and analyzer device of the present invention is designed to be user friendly in both of these environments, providing menus and prompts to aid both the operational and maintenance user during use of the system.

At the block 138, it is determined if the user desires to operate in monitoring mode or maintenance mode. If the user chooses to operate in the monitoring mode then the user is presented with a list of possible functions at the block 140. At the block 142, the user enters the function to be implemented by the data capture and analyzer device and the function is translated into a sequence of digital data. Specifically, the function in this monitoring mode specifies the type of communications, service requests or feature requests which are to be used to trigger the capture of data. Once a trigger event is entered by the user through the user interface, a filter for capturing that data is implemented at the block 144. As described above, the filter is implemented on the IEEE 1394 network interface card 20. When detected, the specific data is captured at the block 146 and stored on the main memory 24, at the block 148.

Once the captured data is stored, appropriate data is displayed on the display 28 at the block 150, based on display criteria entered by the user. In the monitoring mode, a summary of patterns represented by the captured data is displayed at the block 152. This summary shows the monitoring operator the type of requests, the amount of usage and the origination location of the requests to allow the operator to monitor the usage of the system. At the block 154, it is determined whether or not the user desires to store the summary of patterns represented by the captured data on or using the mass storage device 26. The user is prompted, through the user interface, to determine whether the data is to be stored. If the data is to be stored, then the summary of patterns is stored on or using the mass storage device 26, from the main memory 24, at the block 156. Once the data is stored, the method proceeds to the block 158. Otherwise, the method proceeds directly to the block 158 from the block 154.

At the block 158, it is determined whether or not the user desires to print the captured data on the printer 29. The user is prompted, through the user interface, to determine whether the summary of patterns represented by the captured data is to be printed. If the summary of patterns is to be printed, then the summary of patterns is read from the main memory 24 and printed on the printer 29, at the block 160. After the summary of patterns is printed at the block 160 or the user chooses not to print the data at the block 158, it is determined whether the user has chosen a different function at the block 162. If the user has not chosen a different function, the system jumps back to the block 144 to capture the next data communication corresponding to the implemented filter. If the user has chosen a different function, the system jumps back to the block 136 to redisplay the user interface for the user.

If the user chooses to enter the maintenance mode, at the block 138, any problems uncovered during the pre-maintenance and pre-configuration of the system are listed for the user at the block 164. The maintenance user is then presented with a list of possible functions at the block 166. After the block 166, the system implements the steps 74 through 94 of the method illustrated in the flowchart of FIG. 2, allowing the maintenance user to test the system and determine if it is operating properly.

The data capture and analyzer device of the present invention allows a user, through a PC system 10 with an IEEE 1394 interface card 20, to capture and analyze data which is transmitted between the devices within the IEEE 1394 serial bus network 46. The user can specify specific trigger events which will begin the data capture process. Preferably, the trigger events allow a user to at least trigger on a specific packet header, field or data pattern within the stream of data transmitted across the IEEE 1394 serial bus structure. A user is also allowed to trigger on an error and capture a specific time or cycle event within the data stream. The data transmitted across the IEEE 1394 serial bus is then monitored and as soon as the specific trigger event is detected, the specified data is captured by the data capture and analyzer device and stored on the main memory 24. Once captured, the data can then be displayed on the display 28, printed on the printer 29 and stored on the mass storage device 26, from the main memory, thereby allowing the user to analyze and record the captured data for testing and monitoring communications over the IEEE 1394 serial bus network 46.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. An IEEE 1394 serial bus network data capture and analyzer device for capturing and analyzing data transmitted over an IEEE 1394 serial bus comprising:
   a. a physical interface including at least one port configured for coupling to an IEEE 1394 serial bus;
   b. a monitoring and capturing circuit coupled to the physical interface for monitoring data transmitted over the IEEE 1394 serial bus and capturing data meeting predetermined criteria;
   c. a determining circuit coupled to the monitoring and capturing circuit for determining whether components coupled to the IEEE 1394 serial bus are in a first mode or a second mode; and
   d. an output device coupled to the monitoring and capturing circuit and to the determining circuit for summarizing patterns represented by captured data when the components coupled to the IEEE 1394 serial bus are in the second mode.

2. The IEEE 1394 serial bus network data capture and analyzer device as claimed in claim 1 wherein the output device includes a display for providing a user interface through which a user selects the predetermined criteria and data output options and views the summarizing patterns.

3. The IEEE 1394 serial bus network data capture and analyzer device as claimed in claim 2 further comprising an internal memory coupled to the monitoring and capturing circuit, on which the captured data is stored.

4. The IEEE 1394 serial bus network data capture and analyzer device as claimed in claim 3 further comprising a mass storage device coupled to the internal memory for storing the captured data.

5. An IEEE 1394 serial bus network data capture and analyzer device for capturing and analyzing data transmitted over an IEEE 1394 serial bus comprising:

a. means for interfacing to the IEEE 1394 serial bus including at least one port configured for coupling to the IEEE 1394 serial bus;
   b. means for capturing coupled to the means for interfacing for monitoring data transmitted over the IEEE 1394 serial bus and capturing data meeting predetermined criteria;
   c. means for determining coupled to the means for capturing for determining whether components coupled to the IEEE 1394 serial bus are in a maintenance mode or an operational mode; and
   d. means for providing captured data as output coupled to the means for capturing for providing the captured data for analysis and providing summarizing patterns represented by captured data when the components coupled to the IEEE 1394 serial bus are in the operational mode.

6. The IEEE 1394 serial bus network data capture and analyzer device as claimed in claim 5 wherein the means for providing includes a display for displaying captured data to a user.

7. The IEEE 1394 serial bus network data capture and analyzer device as claimed in claim 6 wherein a user interface is also provided through the display for allowing a user to select the predetermined criteria and data output options and view the summarizing patterns.

8. The IEEE 1394 serial bus network data capture and analyzer device as claimed in claim 7 further comprising an internal memory coupled to the monitoring and capturing circuit for storing the captured data.

9. The IEEE 1394 serial bus network data capture and analyzer device as claimed in claim 8 wherein the means for providing includes a printer for providing captured data in printed form.

10. The IEEE 1394 serial bus network data capture and analyzer device as claimed in claim 9 wherein the means for providing further includes a mass storage device coupled to the internal memory for storing the captured data.

11. A method of capturing and analyzing data transmitted over a network comprising the steps of:

a. determining whether components within the network are in a maintenance mode or an operational mode;
   b. monitoring data transmitted over the network, the network is an IEEE 1394 serial bus network;
   c. capturing data transmitted over the network based on predetermined criteria;
   d. Summarizing patterns represented by the captured data when the components within the network are in the operational mode, wherein the summarizing patterns are representative of usage patterns of the network and available features;
   e. storing captured data.

12. The method as claimed in claim 11 further comprising the step of providing a user interface through which captured data and summarizing patterns are displayed and the predetermined criteria are entered.

13. An in-flight entertainment system for providing selected content to one or more passengers on an aircraft during flight, comprising:

a. an operator control station for providing a first display to an operator and allowing the operator to monitor usage patterns of the in-flight entertainment system during flight;
   b. a maintenance control station co-located with the operator control station for providing a second display to a maintenance user and allowing the maintenance user to capture and analyze data transmitted over the system to verify proper operation of the in-flight entertainment system and determine a source of any operational problems;
   c. a physical interface including at least one port configured for coupling the operator control station and the maintenance control station to an IEEE 1394 serial bus of the in-flight entertainment system; and
   d. a monitoring and capturing circuit coupled to the physical interface, the operator control station and the maintenance control station for monitoring data transmitted over the IEEE 1394 serial bus and capturing data meeting predetermined criteria.

14. The in-flight entertainment system as claimed in claim 13 further comprising an internal memory coupled to the monitoring and capturing circuit, on which the captured data is stored.

15. The in-flight entertainment system as claimed in claim 14 further comprising a mass storage device coupled to the internal memory for storing the captured data.

16. The IEEE 1394 serial bus network data capture and analyzer device as claimed in claim 1 wherein the first mode is a maintenance mode and the second mode is an operational mode.

17. The in-flight entertainment system as claimed in claim 13 further comprising a determining circuit coupled to the operator control station and to the maintenance control station for determining whether the operator control station is in an active operational mode or the maintenance control station is in an active maintenance mode.

\* \* \* \* \*